United States Patent [19]

Nakamura et al.

[11] Patent Number: 6,049,455
[45] Date of Patent: Apr. 11, 2000

[54] COOLING UNIT FOR COOLING A HEAT-GENERATING COMPONENTS AND ELECTRONIC APPARATUS HAVING THE COOLING UNIT

[75] Inventors: Hiroshi Nakamura, Ome; Katsuhiko Yamamoto, Nagaoka, both of Japan

[73] Assignees: Kabushiki Kaisha Toshiba, Kawasaki; Toshiba Home Technology, Kamo, both of Japan

[21] Appl. No.: 09/337,752

[22] Filed: Jun. 22, 1999

[30] Foreign Application Priority Data

Jun. 23, 1998 [JP] Japan .................................. 10-175970

[51] Int. Cl.$^7$ ........................................... H05K 7/20
[52] U.S. Cl. .......................... 361/688; 361/689; 361/690; 361/694; 361/695; 361/699; 361/700; 361/704; 257/714; 257/715; 174/15.1; 174/15.2; 174/16.1; 165/80.3; 165/80.4; 454/184
[58] Field of Search ...................... 361/687, 688, 361/689, 690, 694, 695–700, 702, 704; 257/714, 715; 174/15.1, 15.2, 16.1, 16.3; 165/80.3, 80.4; 454/184

[56] References Cited

U.S. PATENT DOCUMENTS

| | | | |
|---|---|---|---|
| 5,896,917 | 4/1999 | Lemont et al. | 165/80.3 |
| 5,898,569 | 4/1999 | Bhatia | 361/700 |
| 5,917,699 | 6/1999 | Hung et al. | 361/697 |
| 5,946,190 | 8/1999 | Patel et al. | 361/700 |
| 5,956,227 | 9/1999 | Kitaoka | 361/695 |
| 5,959,836 | 9/1999 | Bhatia | 361/687 |
| 5,959,837 | 9/1999 | Yu | 361/697 |
| 5,966,286 | 10/1999 | O'Connor et al. | 361/699 |

FOREIGN PATENT DOCUMENTS

| | | |
|---|---|---|
| 8-087348 | 4/1996 | Japan . |
| 8-274480 | 10/1996 | Japan . |
| 9-275288 | 10/1997 | Japan . |
| 10-275032 | 10/1998 | Japan . |

*Primary Examiner*—Leo P. Picard
*Assistant Examiner*—Boris K. Chervinsky
*Attorney, Agent, or Firm*—Finnegan, Henderson, Farabow, Garrett & Dunner, L.L.P.

[57] ABSTRACT

A cooling unit comprising a heat radiating plate and an electric fan device. The heat radiating plate has thermal conductivity and comprises a heat receiving portion and a heat exchanging portion, which are arranged side by side. The heat receiving portion is thermally connected to a heat-generating component. The heat exchanging portion is made integral with the heat receiving portion. The fan device having a fan and a flat fan casing. The fan casing has an air inlet port for drawing cooling air when the fan is driven, an air outlet port for guiding the cooling air, and an opening opposing the inlet port. The opening closed by the heat radiating plate.

19 Claims, 8 Drawing Sheets

COOLING UNIT FOR COOLING A HEAT-GENERATING COMPONENTS AND ELECTRONIC APPARATUS HAVING THE COOLING UNIT

BACKGROUND OF THE INVENTION

The present invention relates to a cooling unit for facilitating the radiation of heat from heat-generating components such as semiconductor packages, and also an electronic apparatus incorporating the cooling unit.

In recent years, portable electronic apparatuses, typified by book-like portable computers and mobile information apparatuses, have been developed. Each of these apparatuses incorporates a high-speed MPU (Microprocessing Unit) and has various functions in order to process multimedia information, such as characters, speech, sound, and images. The higher the integration density the MPU has and the more functions does the MPU perform, the more electric power it consumes while operating. The more electric power the MPU consumes, the more heat it generates. In the case of a portable computer incorporating an MPU, the heat generated by the MPU must be radiated efficiently from the MPU in the housing of the portable computer. It is therefore absolutely necessary to provide a cooling unit in the computer housing to cool the MPU.

A conventional cooling unit is known, which comprises a heat sink and an electric fan device. The heat sink is designed to receive the heat generated by an MPU and made of metal having high thermal conductivity, such as aluminum alloy. The heat sink has a base mounted on the top of the MPU. The electric fan device is secured to the upper surface of the base.

The electric fan device comprises a flat fan casing and a fan supported in the fan casing. The fan casing comprises a bottom wall, a side wall and a top wall. The bottom wall is mounted on the base. The top wall has an air inlet port. The side wall has an air outlet port, which communicate with the inlet port. The fan casing is positioned horizontally on the base, with the axis of the fan extending in the height direction of the computer housing. The cooling unit can therefore be thinner than otherwise.

When the fan of the fan unit is driven, cooling air is drawn toward the bottom wall of the fan casing, through the air inlet port. The cooling air flows along the bottom wall and is exhausted from the outlet port. Thus, the cooling air facilitates the radiation of heat from the MPU.

The cooling unit is, however, thick as a whole. This is inevitably because the heat sink is mounted on the top of the MPU and the fan device is mounted on the upper surface of the heat sink. In this connection it should be noted that a prominent commercial value of portable computers resides in their portability. The housing of a portable computer must therefore be as thin as possible. In view of this it is undesirable to provide a space above the MPU, in order to accommodate the cooling unit.

To make matters worse, a thermal resistance develops at the interface between the base of the heat sink and the bottom wall of the fan casing. This is because the heat generated by the MPU is transmitted from the base to the bottom wall. The thermal resistance renders it difficult to convey the heat to the fan casing with high efficiency. This decreases the efficiency of cooling the MPU.

Another type of a cooling unit that may help to reduce the thickness of computer housing is known. This cooling unit is characterized in that the heat sink and the fan device are arranged side by side. The cooling unit has a heat pipe, which thermally connects the heat sink and the fan casing.

In this cooling unit, the heat pipe transmits the heat generated by the MPU, from the heat sink to the fan casing. The stream of cooling air, generated as the fan device is driven, takes the heat out of the computer housing. Therefore, the heat generated by the MPU can be radiated from the computer housing, without need of mounting the fan device on the heat sink. This is why the cooling unit of this type helps reduce the thickness of the computer housing.

However, a thermal resistance may develop in this cooling unit, too. As mentioned above, the heat pipe thermally connects the heat sink and the fan casing. Depending on how the heat pipe is coupled to the heat sink and to the fan device, a thermal resistance may exists at the node between the heat pipe and the heat sink or at the node between the heat pipe and the fan device, or at both nodes. The heat resistance, if any, may impair the heat transmission from the MPU to the heat pipe and from the heat pipe to the fan casing. Hence, the cooling unit needs to be improved furthermore.

BRIEF SUMMARY OF THE INVENTION

The present invention has been made in view of the foregoing. Its object is to provide a cooling unit, which can cool heat-generating components with high efficiency and can yet be made thin as desired, and also provide an electronic apparatus having this cooling unit.

To accomplish the object described above, a cooling unit according to the first aspect of the invention comprises: a heat radiating plate having a heat receiving portion thermally connected to a heat-generating component and a heat exchanging portion made integral with the heat receiving portion, the heat receiving portion and the heat exchanging portion arranged side by side; and an electric fan device having a fan and a flat fan casing holding the fan, the fan casing having an air inlet port for drawing cooling air when the fan is driven, an air outlet port for guiding the cooling air from the air inlet port, and an opening closed by the heat radiating plate, the opening opposing the air inlet port, with the fan located between the air inlet port and the opening.

The heat, which the heat-generating component generates while operating, is transferred to the heat receiving portion of the heat radiating plate and hence to the heat exchanging portion thereof. To the heat exchanging portion the fan device is secured. When the fan of the fan device is driven, cooling air is dawn in through the air inlet port. The cooling air is exhausted out of the fan casing through the air outlet port.

The heat radiating plate closes the opening of the fan casing, which opposes the air inlet port. The cooling air drawn through the air inlet port is directly applied to the heat radiating plate. No thermal resistance develops between the heat radiating plate and the fan casing. The forced convection of cooling air can cool the heat radiating plate. Hence, the heat generated by the heat-generating component can be radiated efficiently from the heat radiating plate.

The fan casing opens to the heat radiating plate, and no walls exist between the fan and the heat radiating plate. The fan casing can therefore be made thinner than otherwise. In addition, the fan device needs not overlap the heat-generating component. Thus, the cooling unit can be thin and compact.

To accomplish the object described above, an electronic apparatus according to the second aspect of the invention comprises: a housing; a heat-generating component provided in the housing; and a cooling unit provided in the housing, for cooling the heat-generating component. The cooling unit comprises: a heat radiating plate having a heat receiving portion thermally connected to the heat-generating component and a heat exchanging portion made integral with the heat receiving portion, the heat receiving portion and the heat exchanging portion arranged side by side; and an electric fan device having a fan and a flat fan casing holding the fan, the fan casing having an air inlet port for drawing cooling air when the fan is driven, an air outlet port for guiding the cooling air from the air inlet port, and an opening closed by the heat radiating plate, the opening opposing the air inlet port, with the fan located between the air inlet port and the opening.

The heat, which the heat-generating component generates while operating, is transferred to the heat receiving portion of the heat radiating plate and then to the heat exchanging portion thereof. To the heat exchanging portion the fan device is secured. When the fan of the fan device is driven, cooling air is dawn in through the air inlet port. The cooling air is exhausted out of the fan casing through the air outlet port.

The heat radiating plate closes the opening of the fan casing, which opposes the air inlet port. The cooling air drawn through the air inlet port is directly applied to the heat radiating plate. No thermal resistance develops between the heat radiating plate and the fan casing. The forced convection of cooling air can cool the heat radiating plate. The heat generated by the heat-generating component can be radiated efficiently from the heat radiating plate.

The fan casing opens to the heat radiating plate, and no walls exist between the fan and the heat radiating plate. The fan casing can therefore be made thinner than otherwise. This serves to render the housing sufficiently thin.

To accomplish the object described above, an electronic apparatus according to the third aspect of this invention comprises: a housing having a bottom wall; a circuit board having a heat-generating component, provided in the housing and extending parallel to the bottom wall; a heat sink provided in the housing and having a heat receiving portion thermally connected to the heat-generating component and a heat exchanging portion connected to the heat receiving portion, the heat receiving portion and the heat exchanging portion arranged side by side; and an electric fan device arranged at the heat exchanging portion of the heat sink, the fan device having a fan and a flat fan casing holding the fan. The fan casing has an air inlet port for drawing cooling air when the fan is driven, an air outlet port for guiding the cooling air from the air inlet port and an opening closed by the heat exchanging portion. The fan casing constitutes, jointly with the heat exchanging portion, an air passage extending from the air inlet port to the air outlet port. The opening of the fan casing opposes the air inlet port, with the fan located between the air inlet port and the opening.

The heat, which the heat-generating component generates while operating, is transferred to the heat receiving portion of the heat radiating plate and then to the heat exchanging portion thereof. To the heat exchanging portion the fan device is secured. When the fan of the fan device is driven, cooling air is dawn in through the air inlet port. The cooling air is exhausted out of the fan casing through the air outlet port.

The heat radiating plate and the fan casing constitute the air passage. The cooling air flowing through the air passage is directly applied to the heat radiating plate. No thermal resistance develops between the heat radiating plate and the fan casing. The forced convection of cooling air can cool the heat radiating plate. The heat generated by the heat-generating component can therefore be radiated efficiently from the heat radiating plate.

The fan casing opens to the heat radiating plate, and no walls exist between the fan and the heat radiating plate. The fan casing can therefore be made thinner than otherwise. Furthermore, space need not be provided above the heat-generating component to accommodate the fan device, because the heat receiving portion and the heat exchanging portion arranged side by side along the bottom wall of the housing. Since the fan casing can be made thin and no space needs to be provided above the heat-generating component, the housing can be made sufficiently thin.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A portable computer, which is the first embodiment of this invention, will be described, with reference to FIGS. 1 to 10.

Figure 1:
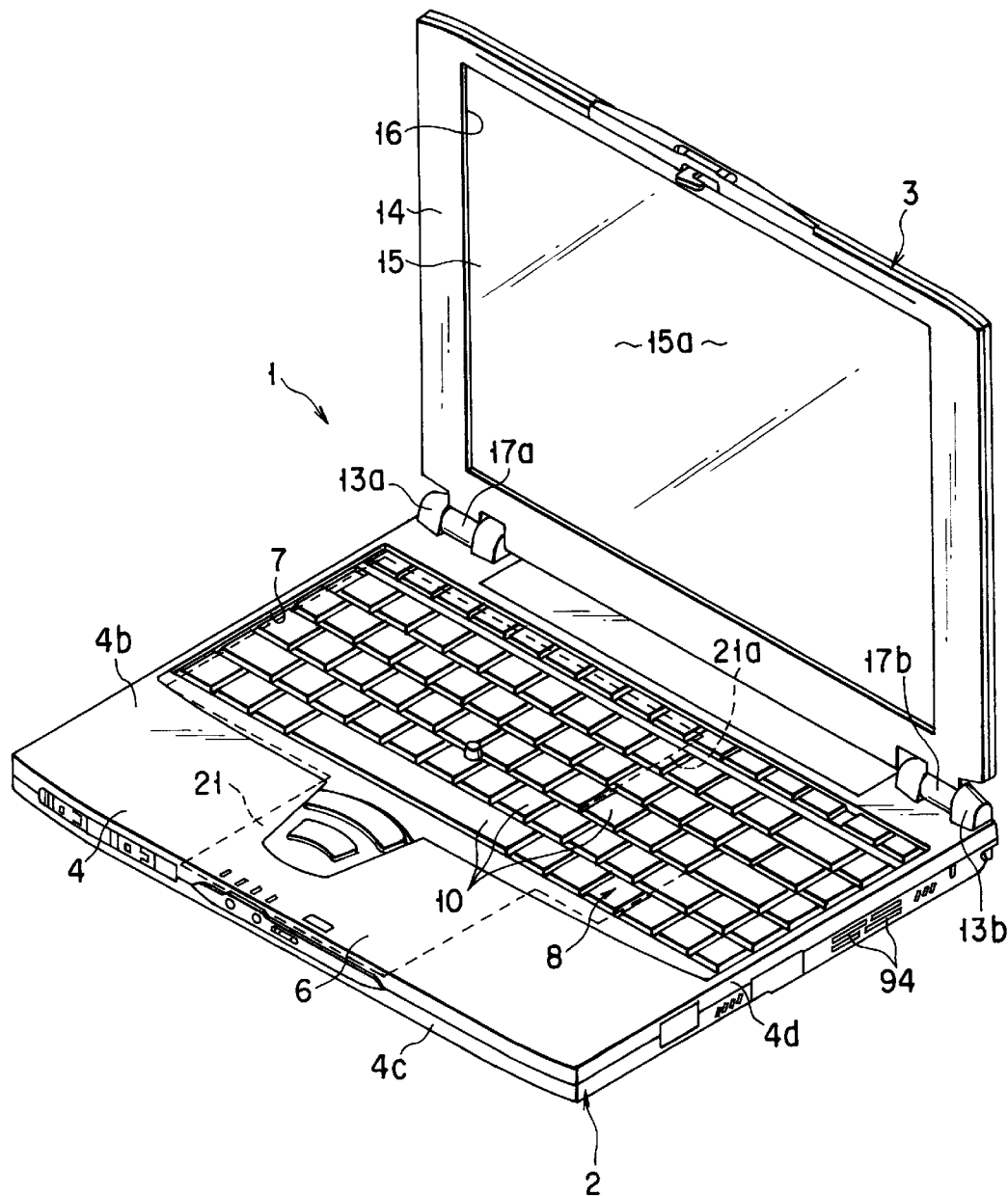
FIG. 1 is a perspective view of a portable computer according to the first embodiment of the present invention.
Figure 2:
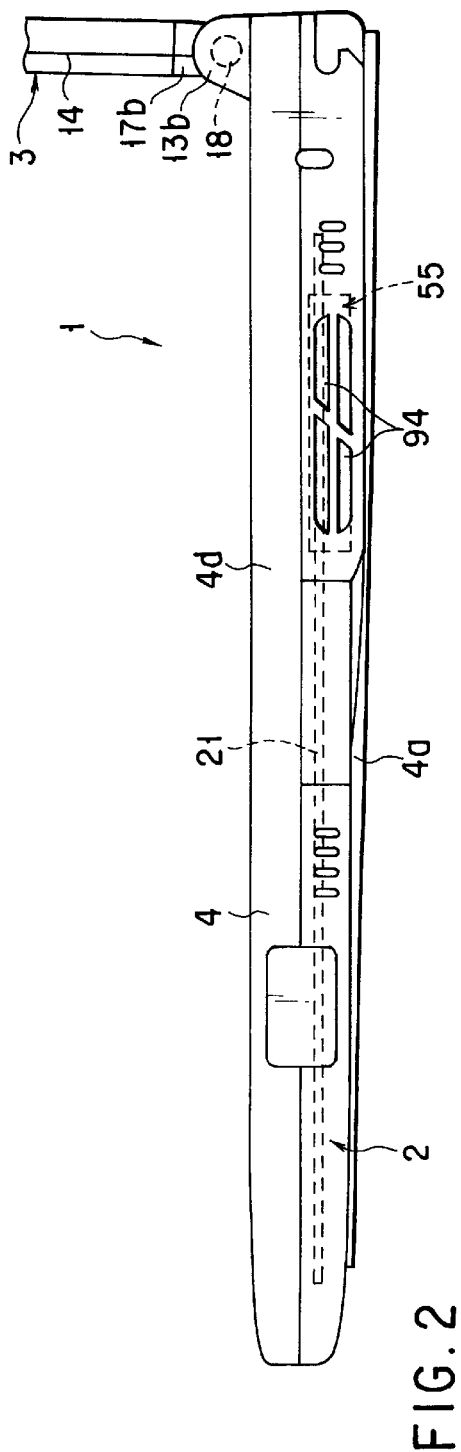
FIG. 2 is a side view of the portable computer shown in FIG. 1.

FIG. 1 shows the book-like portable computer 1, or an electronic apparatus according to the present invention. The portable computer 1 comprises a main body 2 and a display unit 3 supported by the main body 2.

The main body 2 has a box-shaped housing 4. The housing 4 is made of metal having high thermal conductivity, such as magnesium alloy. The housing 4 comprises a bottom wall 4a, a top wall 4b, a front wall 4c, left and right side walls 4d, and a rear wall (not shown). The top wall 4b opposes the bottom wall 4a. The front wall 4c, side walls 4d and rear wall connect the bottom wall 4a and top wall 4b. The housing 4 is about 20 mm thick, being thinner than the housings of most conventional portable computers.

The top wall 4b of the housing 4 has a palm rest 6 and a keyboard recess 7. The palm rest 6 is rectangular, extending in the widthwise direction of the housing 4. The keyboard recess 7 is located at the back of the palm rest 6. The recess 7 has an opening, which communicates with the interior of the housing 4.

Figure 3:
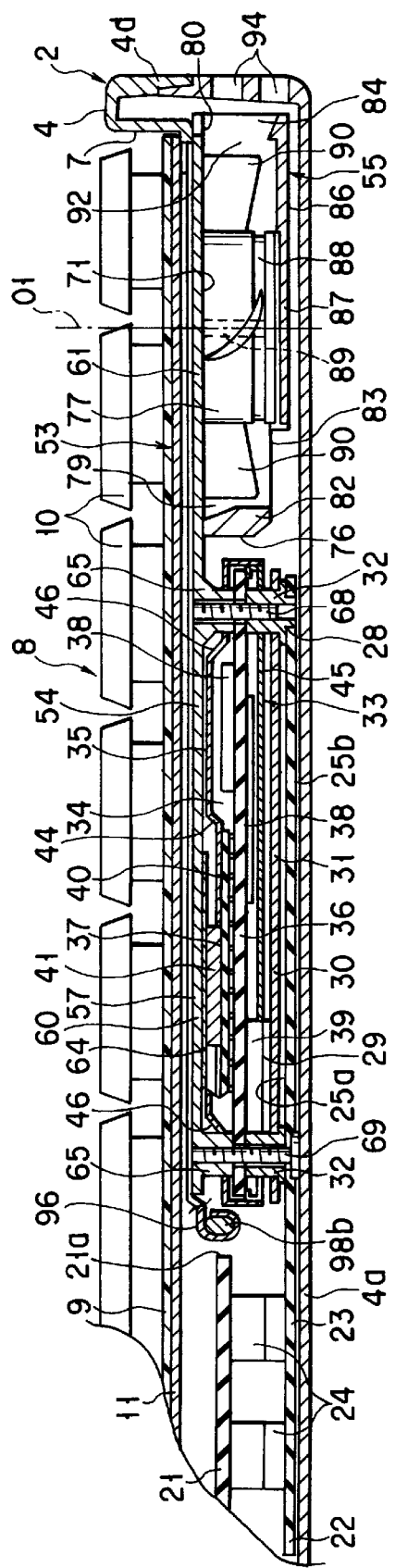
FIG. 3 is a sectional view of the portable computer, showing the positional relation of the MPU and the cooling unit.

A keyboard 8 is fitted in the keyboard recess 7. As shown in FIG. 3, the keyboard 8 comprises a keyboard base 9, a number of keys 10, and a reinforcing plate 11 made of metal. The keyboard base 9 is a rectangular plate, which is fitted in the recess 7 with no gaps between it and the recess 7. The keys 10 are arranged on the upper surface of the keyboard base 9. The reinforcing plate 11 is mounted on the lower surface of the keyboard base 9. The plate 11 is exposed to the interior of the housing 4, through the opening of the keyboard recess 7.

As shown in FIG. 1, the top wall 14b of the housing 4 has a pair of display supports 13a and 13b, which extend upwards. The display supports 13a and 13b are located at the rear part of the top plate 4b. The supports 13a and 13b are spaced from each other in the widthwise direction of the housing 4.

The display unit 3 comprises a flat, box-like display housing 14 and a liquid-crystal display module 15. The display housing 14 has a front wall, which has a rectangular opening 16. The display module 15 is a flat component set in the display housing 14. The display module 15 has a screen 15a for displaying characters and images. The screen 15a is exposed through the rectangular opening 16 made in the front wall of the display housing 14.

The display housing 14 has a pair of legs 17a and 17b. The legs 17a and 17b protrude downwards from the lower edge of the housing 14. The legs 17a and 17b are hinged to the display supports 13a and 13b, respectively, by means of hinge devices 18 (shown in FIG. 2). The display unit 3 is thereby connected to the housing 4 and can be rotated. More specifically, the unit 3 can be rotated between a closed position and an opened position. In the closed position, the display unit 3 covers the palm rest 6 and keyboard 8. In the opened position, the display unit 3 opens the palm rest 6, keyboard 8 and display screen 15a.

As shown in FIG. 3, a first circuit board 21 and a second circuit board 22 are provided in the housing 4. The first circuit board 21 is located below the palm rest 6 and keyboard 8 and extends parallel to the bottom wall 4a of the housing 4. As FIG. 1 shows, the first circuit board 21 has a notch 21a. The notch 21a is cut in the corner defined by the right and rear edge of the first circuit board 21. The notch 21a is located below the right-end part of the keyboard 8a and adjacent to the right side wall 4d of the housing 4.

Figure 4:
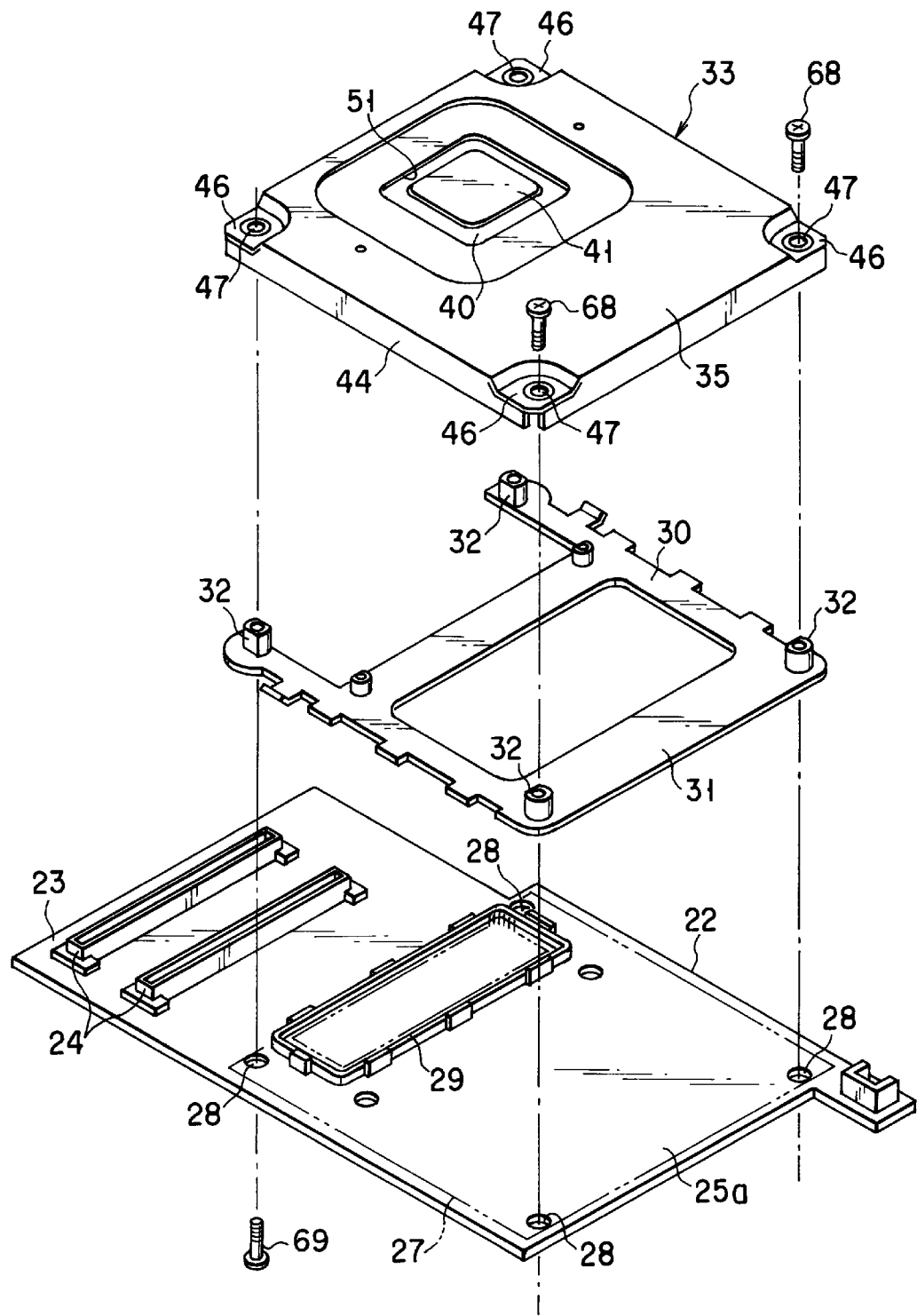
FIG. 4 is an explosive view depicting the second circuit board and the MPU, both incorporated in the portable computer.

The second circuit board 22 extends along the bottom wall 4a of the housing 4 and is located below the notch 21a of the first circuit board 21. As shown in FIG. 4, the second circuit board 22 has an extension 23 at one end. The extension 23 extends below the first circuit board 21. A pair of stacking connectors 24 electrically connects the extension 23 to the first circuit board 21.

The second circuit board 22 has an upper surface 25a and a lower surface 25b. The lower surface 25b opposes the bottom wall 4a of the housing 4. As shown in FIG. 4, the upper surface 25a has a rectangular MPU-mounting region 27. The region 27 is exposed to the interior of the housing 4. Four through holes 28 are made in the MPU-mounting region 27. The holes 28 are located at the four corners of the region 27, respectively.

A first connector 29 and an MPU holder 30 are arranged in the MPU-mounting region 27. The first connector 29 is electrically connected to the second circuit board 22. The MPU holder 30 comprises a metal frame 31 and four bosses 32. The bosses 32 are secured to the metal frame 31. The metal frame 31 is a flat plate and laid on the upper surface 25a of the second circuit board 22. The bosses 32 are axially aligned with the through holes 28 made in the second circuit board 22. The bosses 32 project upwards from the metal frame 31 and are located above the MPU-mounting region 27 of the second circuit board 22.

As shown in FIGS. 3 and 4, the MPU holder 30 supports an MPU (Microprocessing Unit) 33. The MPU 33 comprises a multi-chip module 34 (hereinafter referred to as "MCM 34") and a flat case 35 holding the MCM 34.

As is best illustrated in FIG. 3, the MCM 34 comprises a multi-layered wiring board 36, a BGA-type semiconductor package 37, a plurality of QFP-type semiconductor packages 38, and a second connector 39. The BGA-type package 37 is mounted on the upper surface of the wiring board 36. Some of the QFP-type packages 37 are mounted on the upper surface of the wiring board 36. The other QFP-packages 37 are mounted on the lower surface of the wiring board 36. The second connector 39 is mounted on the lower surface of the wiring board 36.

The BGA-type semiconductor package 37 comprises a base 40 and an IC chip 41. The base 40 is mounted on the upper surface of the wiring board 36. The IC chip 41 is connected to the base 40 by solder balls, in the form of a flip chip. The IC chip 41 consumes much power while operating to process useful multimedia information such as characters, speech, sound and images. The chip 41 therefore generates much heat while operating and needs to be cooled to keep normally operating.

The case 35, which is shown in FIG. 3 and 4, is made of metal having high thermal conductivity, such as aluminum alloy. The case 35 comprises a main body 44 and a cover 45. The main body 44 covers the upper surface of the wiring board 36 and the semiconductor packages 37 and 38. The main body 54 has four corners, in which four recesses 56 are made. The recesses 46 are vertically aligned with the bosses 32 of the MPU holder 30. Each recess 46 has a through hole 47. The bottom of each recess 46 is at a level a little higher than the upper surface of the wiring board 36. The cover 45 is removably latched to the main body 44, covering the opening made in the main body 44. The cover 45 covers the lower surface of the wiring board 36 and the semiconductor packages 38 mounted on the lower surface of the board 36. The cover 45 cooperates with the recesses 46, clamping the wiring board 36. The board 36 is thereby secured to the case 35.

The cover 45 of the case 35 overlaps the MPU holder 30. The bosses 32 of the MPU holder 30 are inserted into the case 35 through the cover 45. The tips of the bosses 32 contact the lower surface of the wiring board 36.

The second connector 39, which is mounted on the lower surface of the wiring board 36, extends through the cover 45 and is exposed outside the case 35. The second connector 39 is fitted to the first connector 29. The MPU 33 and the second circuit board 22 are thereby electrically connected.

As shown in FIGS. 3 and 4, the main body 44 of the case 35 has an opening 51. The opening 51 is rectangular and larger than the IC chip 41. The IC chip 41 is exposed through the opening 51.

Figure 7:
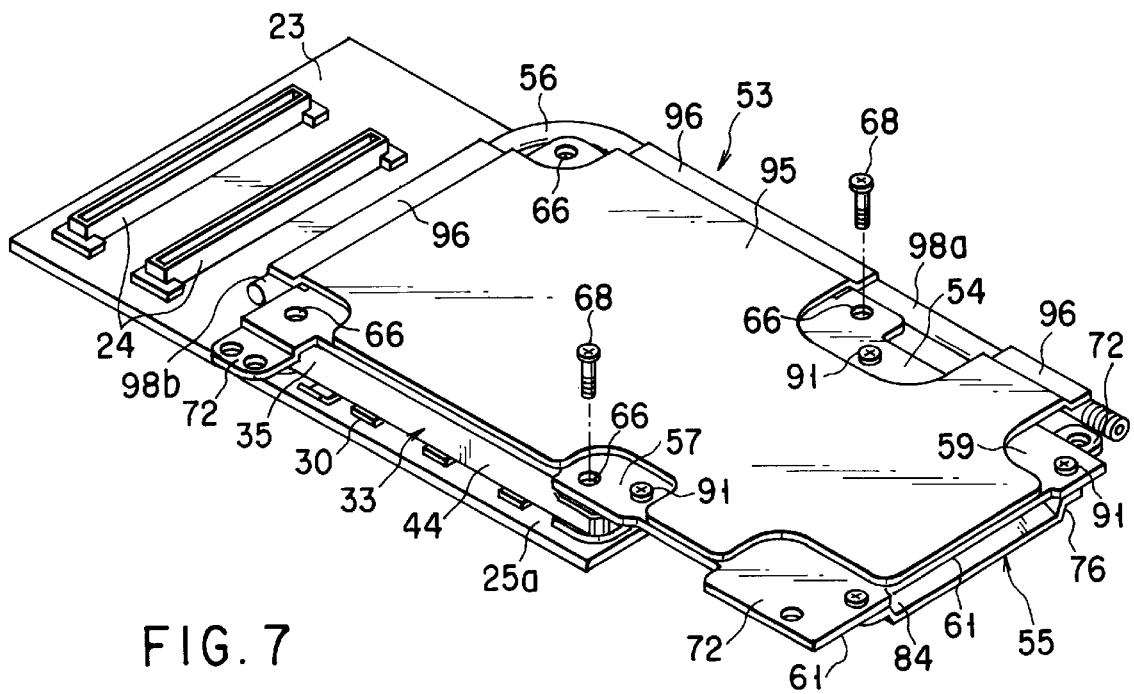
FIG. 7 is a perspective view of the cooling unit to which the MPU is thermally connected.
Figure 8:
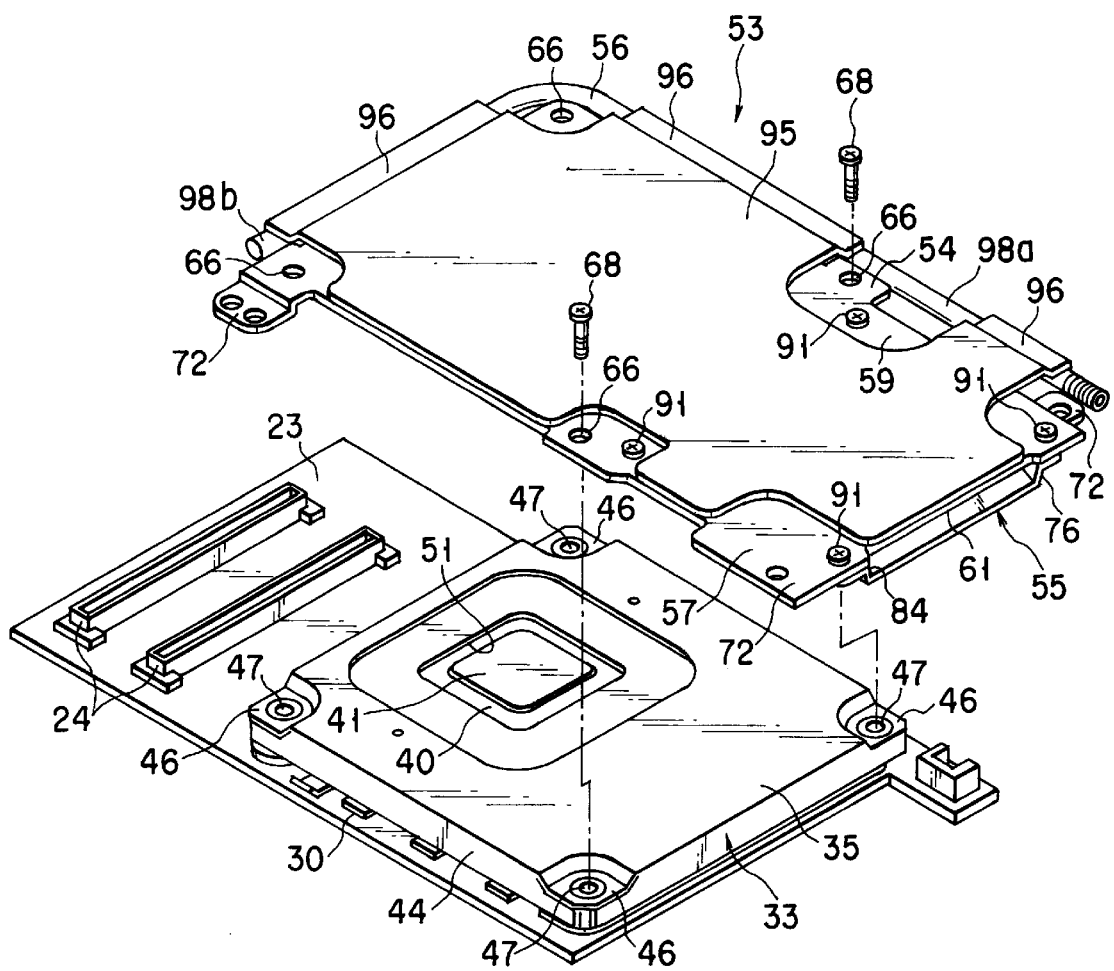
FIG. 8 is an exploded perspective view depicting the MPU mounted on the second circuit board, and the cooling unit.
Figure 9:
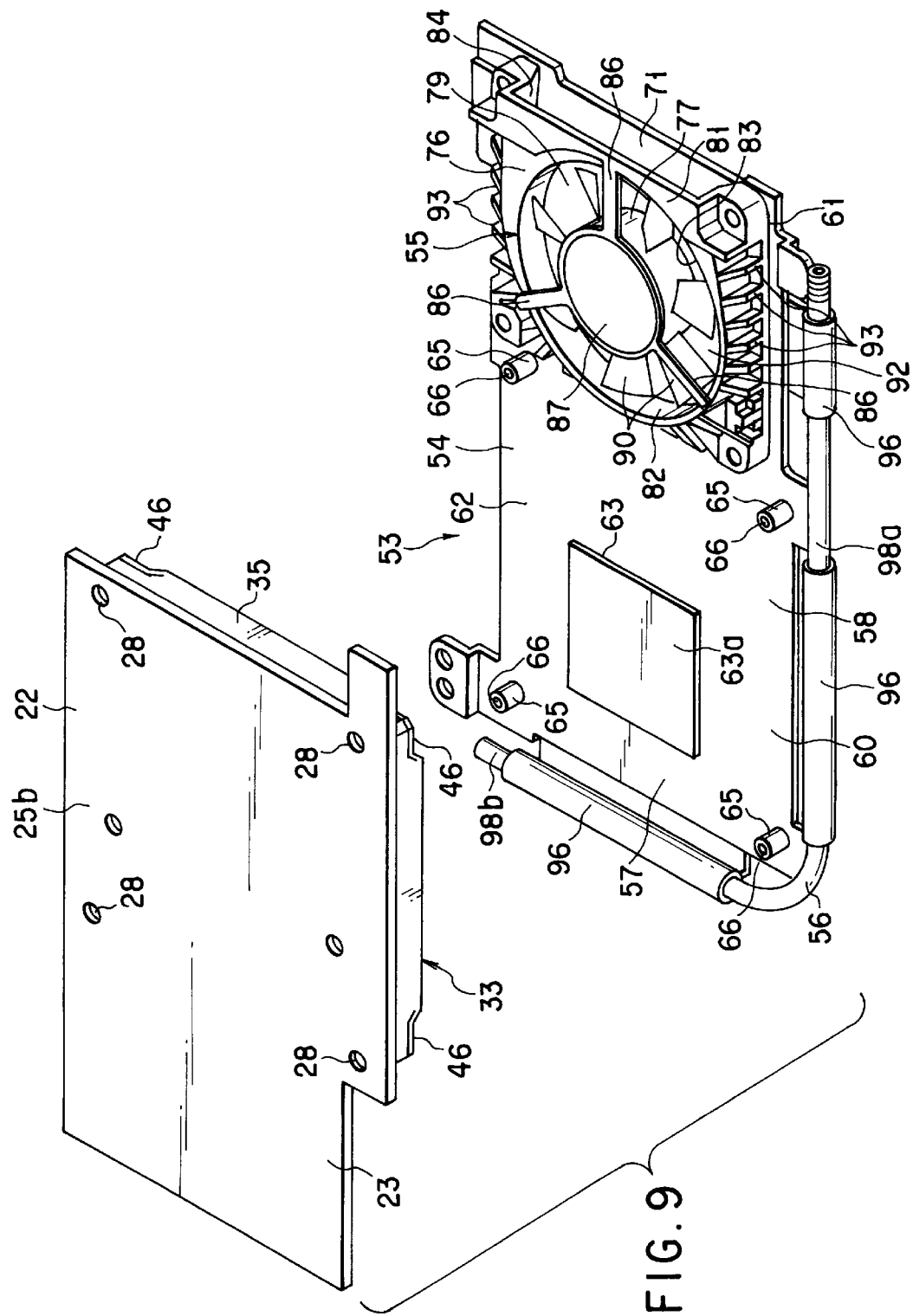
FIG. 9 is another exploded view illustrating the MPU mounted on the second circuit board, and the cooling unit.

As illustrated in FIGS. 7 to 9, a cooling unit 53 is secured to the case 35 of the MPU 33. The unit 53 is designed to cool the IC chip 41. The cooling unit 53 comprises a heat sink 54, an electric fan device 55, and a heat pipe 56.

The heat sink 54 has a flat rectangular heat radiating plate 57, which extends in the width direction of the housing 4. The heat radiating plate 57 is made of metal having high thermal conductivity, such as aluminum alloy or copper alloy. The plate 57 has a lower surface 58 and an upper surface 59 facing away from the lower surface 58.

As is best shown in FIG. 9, the heat radiating plate 57 has a heat receiving portion 60 and a heat exchanging portion 61. The portions 60 and 61 are arranged on the lower surface 58 of the plate 57, side by side, in the width direction of the housing 4. The heat receiving portion 60 has a heat receiving surface 62 and a seat 63. The seat 63 projects downward from the heat receiving surface 62 for a short distance. The seat 63 has a flat seat surface 63a. The seat surface 63a opposes the opening 51 of the main body 44 of the case 35.

Four bosses 65 are provided on the heat receiving surface 62 and arranged around the seat 63. The bosses 65 protrude downward from the heat receiving surface 62. The bosses 65 are vertically aligned with the recesses 46 made in the corners of the main body 44. The tips of the bosses 65 contact the upper surface of the wiring board 36. Each of the bosses 65 has a screw hole 66. The screw holes 66 of the bosses 65 are axially aligned with the through holes 47 made in the recess 46, respectively, and open at the upper surface of the heat sink 54.

As shown in FIG. 8, two screws 68 are inserted into the screw holes 66 made in two of the bosses 65, respectively, from above the heat sink 54. The two screws 68 pass through the through holes 47 made in the recesses 46 and also through the wiring board 36 and are set in screw engagement in the through holes 28 made in the second circuit board 22. As shown in FIG. 4, screws 69 are inserted from below into the remaining two through holes 28 of the second circuit board 22. The screws 69 pass through the wiring board 36 and the through holes 47 made in the recesses 46 and are set in the screw holes 66 made in the remaining two bosses 65.

As shown in FIGS. 3 and 7, the second circuit board 22 and the heat radiating plate 57 of the heat sink 54 are connected to each other, clamping the MPU 33 between them. The MPU 33 is therefore pressed onto the surface 25a of the second circuit board 22. The first connector 29 and the second connector 39 remain fitted together. The heat receiving portion 60 of the heat radiating plate 57 is secured to the MPU 33.

The seat surface 63a of the portion 60 opposes the IC chip 41, spaced therefrom by a short distance. The gap between the seat surface 63a and the IC chip 41 is filled with electrically conductive grease 64. The grease 64 can transfer heat between the heat receiving portion 60 and the IC chip 41.

Figure 5:
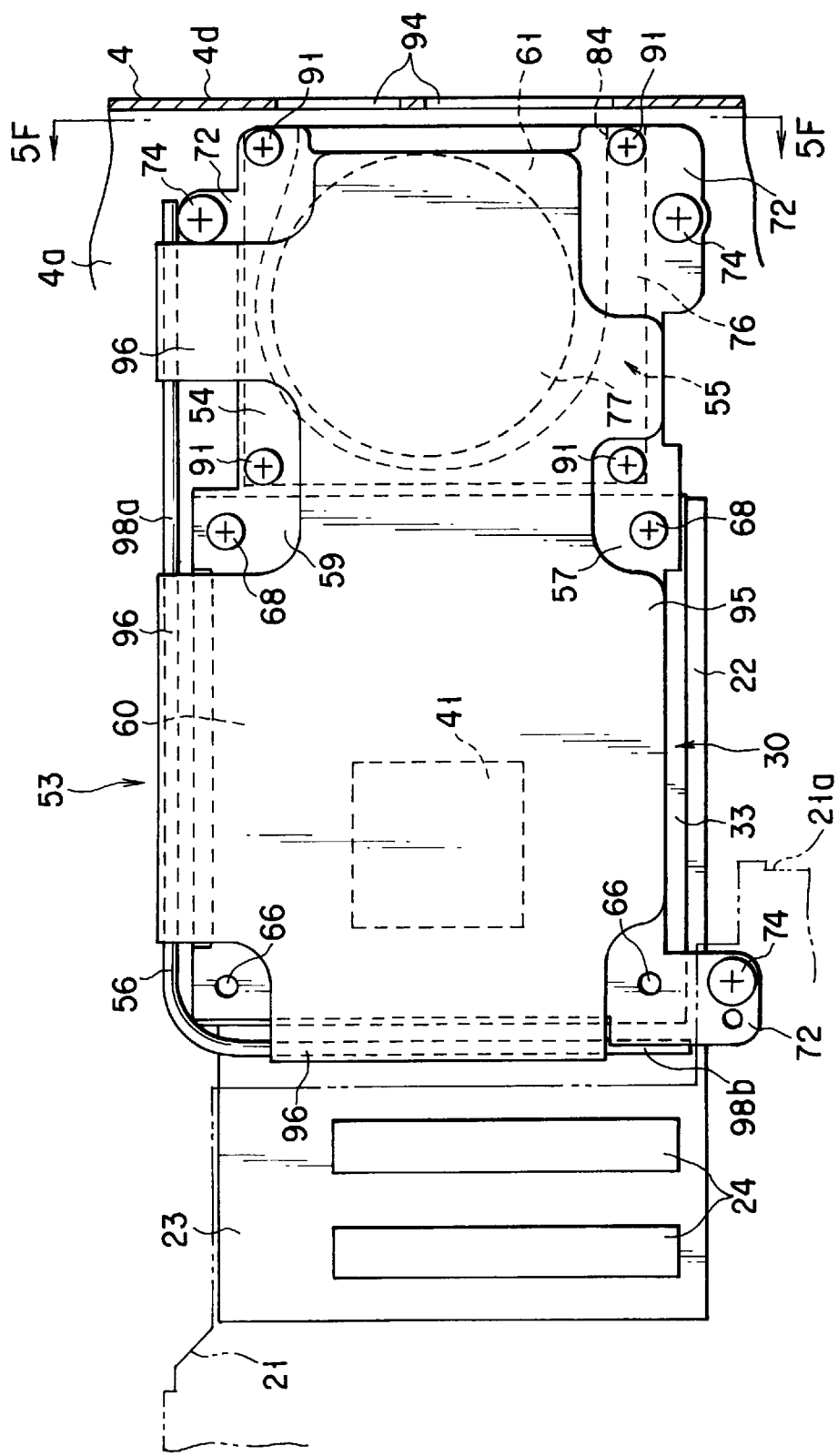
FIG. 5 is a plan view of the cooling unit set in the housing of the portable computer.

As shown in FIGS. 3 and 5, the heat exchanging portion 51 of the heat radiating plate 57 projects from a side of the MPU 33 and a side of the second circuit board 22 and opposes the bottom wall 4a of the housing 4. The heat exchanging portion 61 has a flat guide surface 71. The guide surface 71 is flush with the heat receiving surface 62 of the heat receiving portion 60.

Figure 6:
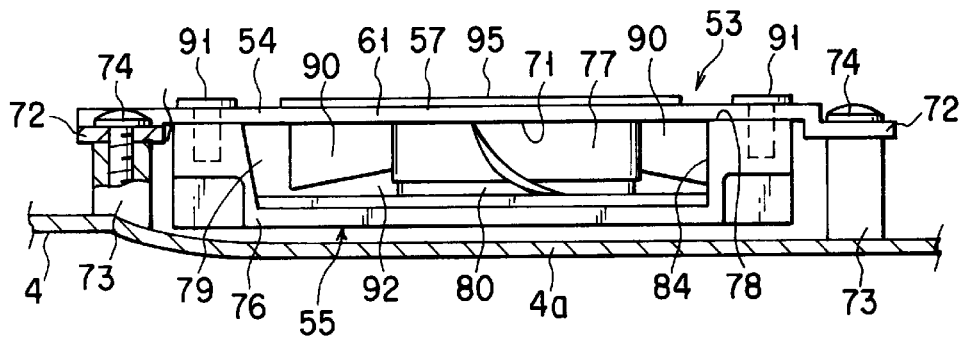
FIG. 6 is a sectional view taken along line 5F—5F in FIG. 5.

The heat radiating plate 57 has a plurality of brackets 72, which project from the sides of the heat receiving portion 60 and heat exchanging portion 61. As shown in FIG. 6, the brackets 72 are secured, by screws 74, to seats 73 protruding upwards from the bottom wall 4a of the housing 4. The heat radiating plate 57 is thereby arranged, extending parallel to the bottom wall 4a. The guide surface 71 of the heat exchanging portion 61 faces the bottom wall 4a and lies near the right side wall 4d of the housing 4.

Figure 10:
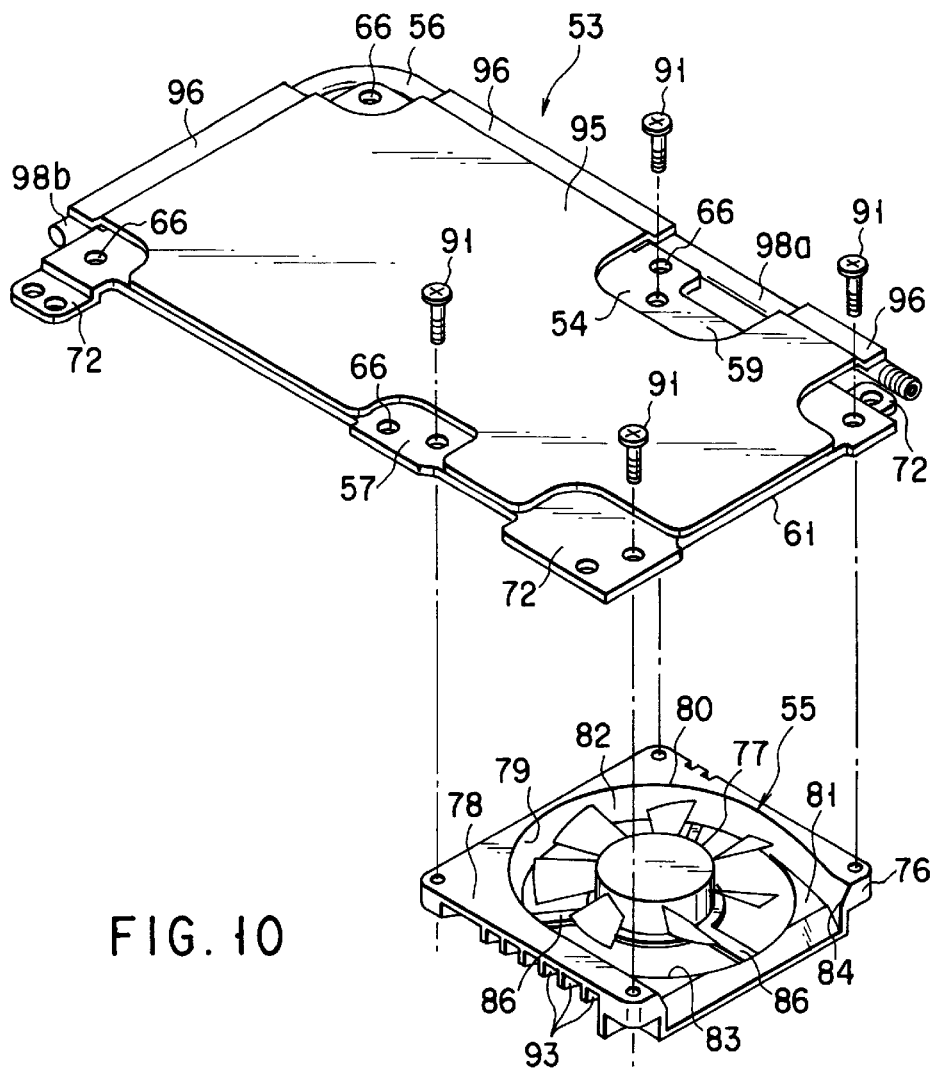
FIG. 10 is an exploded view showing the heat sink and the fan device.

As shown in FIGS. 9 and 10, the fan device 55 is supported on the guide surface 71 of the heat exchanging portion 61. The fan device 55 comprises a fan casing 76 and a fan 77 provided in the fan casing 76. The fan casing 76 is made of metal having high thermal conductivity, such as aluminum alloy. The fan casing 76 is a flat rectangular frame that has four corners. The fan casing 76 has almost the same thickness as the case 35 of the MPU 33. The casing 76 has a flat support surface 78 that overlaps the guide surface 71 of the heat exchanging portion 61. A fan receptacle 79 is made in the center part of the support surface 78.

The fan receptacle 79 forms a recess made in the top of the fan casing 76. The receptacle 79 has an opening 80, a bottom wall 81, and a circular wall 82. The opening 80 is almost as large as the support surface 78 of the fan casing 76. The opening 80 exposes the bottom wall 81. The circular wall 82 connects the bottom wall 81 to the support surface 76. The bottom wall 81 has a circular air inlet port 83, which is axially aligned with the opening 80. The circular wall 82 has an exhaust port 84 in one side of the receptacle 79. Hence, the axis of the exhaust port 84 extends at right angles to the axis of the opening 80. The port 84 is provided at one end of the fan receptacle 79.

As illustrated in FIGS. 9 and 10, the fan casing 76 has a number of radiation fins 93. The fins 93 are arranged around the air inlet port 83 of the fan receptacle 79.

A motor support 87 is provided in the air inlet port 83 in axial alignment therewith. The support 87 is secured to the bottom wall 81 by a plurality of stays 86, which extend in radial direction of the air inlet port 83, from the inner periphery thereof. The motor support 87 supports a flat, brush-less DC motor 88 (FIG. 3). The motor 88 has a shaft 89, which is coaxial with the air inlet port 83 and extends in the direction of thickness of the fan casing 76. The motor 88 is electrically connected to the second circuit board 22 by lead lines (not shown). The motor 88 is turned on when the temperature of the MPU 33 reaches a predetermined value.

The fan 77 is connected to the shaft 89 of the motor 88. The fan 77 has a plurality of blades 90. The tips of the blades 90 are close to the circular wall 82 of the fan receptacle 79. The fan 77 has an axis O1 that is aligned with the shaft 89. The opening 80 and the air inlet port 83 are aligned with the axis O1 of the fan 77. The exhaust port 84 of the fan casing 76 is located away from the axis O1 of the fan 77.

As shown in FIGS. 5 and 10, the fan casing 76 is fastened to the heat exchanging portion 61 of the heat radiating plate 57, at its four corners, by means of screws 91. The support surface 78 of the fan casing 76 is thereby set in contact with the guide surface 71 of the heat exchanging portion 61. The guide surface 71 closes the opening 80 of the fan receptacle 79. The guide surface 71 of the heat radiating plate 57 therefore opposes the fan 77, defining an air passage 92 jointly with the bottom wall 81 and circular wall 82 of the fan receptacle 79. The air passage 92 communicates with the air inlet port 83 and the exhaust port 84.

As shown in FIG. 3, the fan device 55 is secured to the guide surface 71 of the heat sink 54 and positioned horizontally, with the axis O1 of the fan 77 intersecting at right angles to the guide surface 71. Thus, the fan device 55 extends along the heat radiating plate 57. The plain in which the air inlet port 83 exists is spaced from the bottom wall 4a of the housing 4 by a short distance.

The exhaust port 84 of the fan casing 76 faces away from the MPU 33 and opens to the right side wall 4d of the housing 4. The right side wall 4d has an exhaust port 94, which communicates with the exhaust port 84 of the fan casing 76. Hence, the exhaust port 84 therefore communicates with the air passage 92.

As shown in FIGS. 7 to 10, a heat conducting plate 95 overlaps the upper surface 59 of the heat radiating plate 57. The heat conducting plate 95 is made of metal having high thermal conductivity, such as aluminum alloy or copper alloy. The plate 95 is secured to the surface 59 of the heat radiating plate 57, either located near the reinforcing plate 11 or set in contact therewith.

The heat conducting plate 95 has a plurality of support members 96, which support the heat pipe 56. The support members 96 extend from two adjoining sides of the heat radiating plate 57. One of the members 96 is located at the heat exchanging portion 61 of the heat radiating plate 57. The other members 96 are located at the heat receiving portion 60 of the heat radiating plate 57.

The heat pipe 56 has two pipe portions 98a and 98b. The first pipe portion 98a extends along one long side of the heat radiating plate 57. The second pipe portion 98b extends along one short side of the heat radiating plate 57. The first pipe portion 98a is positioned, with one end located near the heat exchanging portion 61 of the heat radiating plate 57. The other end of the first pipe portion 98a and the second pipe portion 98b are located near the heat receiving portion 60 of the plate 57. The heat pipe 97 therefore extends along both the heat receiving portion 60 and the heat exchanging portion 61.

When the portable computer 1 is used, the IC chip 41 of the MPU 33 generates heat. The heat is transmitted to the seat 58 of the heat radiating plate 57 through the grease 64. The heat is positively conducted from the plate 57 to the heat receiving portion 60 and hence to the heat exchanging portion 61. At the same time, the heat pipe 56 efficiently conducts the heat from the heat receiving portion 60 to the heat exchanging portion 61, because the pipe 56 is connected to the heat sink 54 and extends along both the heat receiving portion 60 and the heat exchanging portion 61. Thus, the heat is conducted from the heat receiving portion 60 to the heat exchanging portion 61 through two heat passages.

When the temperature of the MPU 33 reaches a predetermined value, the brush-less DC motor 88 starts driving the fan 77. The fan 77 forces air from the housing 4 into the air passage 92 through the air inlet port 83. The air flows through the passage 92 toward the exhaust port 84, effectively cooling the fan casing 95a and the heat radiating plate 57. The heat conducted to the heat exchanging portion 61 is thereby radiated. The air, or cooling air, is expelled from the fan casing 76 through the exhaust port 84 and finally from the housing 4 through the exhaust port 94.

The opening 80 of the fan casing 76 is axially aligned with the air inlet port 83 and is closed by the guide surface 71 of the heat radiating plate 57. The guide surface 71 defines the air passage 92, jointly with the fan casing 76. Therefore, the cooling air flowing through the air passage 92 is applied directly to the guide surface 71.

This means that no thermal resistance exists between the heat radiating plate 64 and the fan casing 76. Transfer of heat between the plate 64 and the casing 76 is not prevented at all.

The heat radiating plate 57 is thereby efficiently cooled with forced convection of the cooling air. As a result, the heat generated by the IC chip 41 and conducted to the heat radiating plate 57 can be radiated from the housing 4 with high efficiency.

As mentioned above, the fan casing 76 secured to the heat radiating plate 57 is made of metal that excels in thermal conductivity. Heat is efficiently conducted from the heat radiating plate 57 to the fan casing 76. The fan casing 76 can therefore serve as a part of the heat sink 54.

In addition, the heat conducted to the fan casing 76 can efficiently diffuse into the housing 4 and can then be efficiently released from the housing 4 into the atmosphere. This is because the fan casing 76 has a number of radiation fins 93 as mentioned above and therefore contacts the cooling air over a larger area. Namely, natural air-cooling is accomplished as the heat generated by the MPU 33 diffuses from the heat sink 54 to the fan casing 76, and the heat is released from the housing 4. Thus, the MPU 33 is cooled with high efficiency, by both the natural cooling and the forced cooling achieved by the fan device 55.

The radiation fins 93 are provided around the air inlet port 83. This means that the fins 93 are located in the passage through which the cooling air flows toward the air inlet port 83 when the fan 77 is driven. The radiation fins 93 are directly exposed to the flow of cooling air. This further enhances the heat radiating efficiency of the fan casing 76.

Further, the guide surface 71 of the heat radiating plate 57 that closes the opening 80 of the fan casing 76 is finished smooth. The resistance to the cooling air is therefore low in the air passage 92. The speed of the air flowing through the passage 92 increases. This enhances the heat radiating efficiency of the plate 57 and helps to reduce the noise the fan device 55 makes while operating.

The fan casing 76 of the fan device 55 directly opposes the guide surface 71 of the heat radiating plate 57. In other words, no partitions exist between the guide surface 71 and the fan 77. The fan casing 76 can be thinner than otherwise. The fan casing 76 has a thickness substantially equal to that of the case 35 of the MPU 33. The air passage 92 can, therefore, be provided well within the case 35.

In addition, no space needs to be provided above the MPU 33 to accommodate the fan device 55, because the MPU 33 and fan device 55 are arranged side by side in the width direction of the housing 4 and at substantially the same level in the housing 4. Thus, not only the fan casing 76 be made thinner, but also the housing 4 can be made thinner without taking particular measures.

The present invention is not limited to the first embodiment described above. The second embodiment of To the invention will be described, with reference to FIG. 11.

The second embodiment is different from the first embodiment, only in that the fan device 55 is inclined to the heat radiating plate 57 of the heat sink 54. Except this point, the second embodiment is identical to the first embodiment in basic structure. Therefore, the components similar or identical to those of the first embodiment are therefore designated at the same reference numerals and will not be described in detail.

Figure 11:
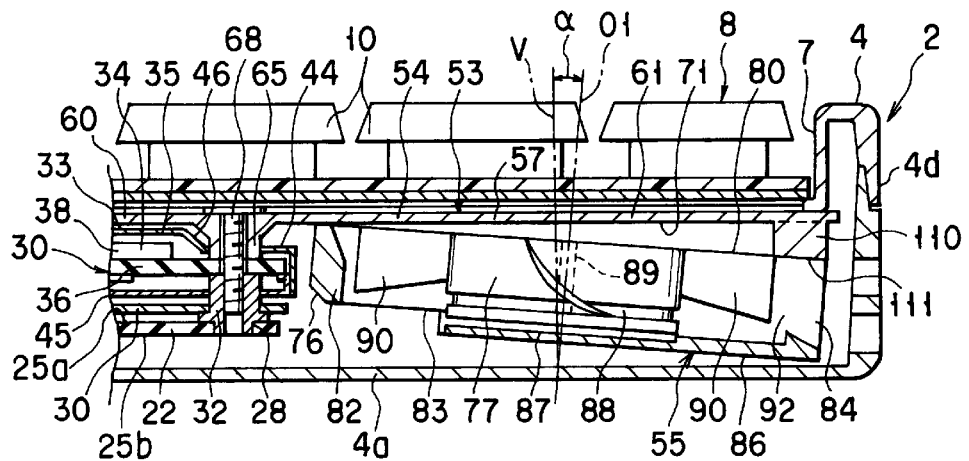
FIG. 11 is a sectional view of a portable computer according to the second embodiment of the invention.

As shown in FIG. 11, a fan-supporting wall 110 extends downwards from the guide surface 71 of the heat radiating plate 57. The fan-supporting wall 110 has a surface 111, which the flat support surface 78 of the fan casing 76 contacts. The fan casing 76 is fastened to the surface 11 by screws.

The surface 111 of the fan-supporting wall 110 inclines downwardly to the right side wall 4d of the housing 4. Thus, the fan casing 76 is inclined at angle α to the vertical line V, so that the axis O1 of the fan 77 leans against the right side of the housing 4. Thanks to the inclination of the fan casing 76, the distance between the bottom wall 4a of the housing 4 and the plane in which the air inlet port 83 of the casing 76 lines increases. The angle α at which the fan casing 76 inclines influences the thickness of the housing 4. To make the housing 4 sufficiently thin, it is desired that the angle a range from 5 to 10°.

In the second embodiment described above, the fan casing 76 is held in the housing 4 and inclined to the vertical line V at a predetermined angle. The resistance to the air flowing in the housing 4 through the air inlet port 83 of the fan casing 76 is therefore decreased. This makes it possible to conduct more air into the air passage 92. Moreover, the forced convection of air effectively cools the heat sink 54, enhancing the efficiency of radiating heat from the MPU 33.

In the first embodiment, the guide surface of the heat sink, which defines the air passage, is flat and smooth. The present invention is not limited to this structural feature. Radiation fins may be formed in large numbers on the guide surface, thus increasing the area at which the guide surface contacts the cooling air. This helps increase the efficiency of cooling the heat sink.

The heat sink conducts heat by itself. If heat can be transferred from the heat receiving portion of the heat sink to the heat exchanging portion thereof, the heat pipe need not be used to perform the auxiliary transfer of heat.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A cooling unit comprising:
    a heat radiating plate having a heat receiving portion thermally connected to a heat-generating component and a heat exchanging portion made integral with the heat receiving portion, said heat receiving portion and said heat exchanging portion arranged side by side; and
    an electric fan device having a fan and a flat fan casing holding the fan, said fan casing having an air inlet port for drawing cooling air when the fan is driven, an air outlet port for guiding the cooling air from the air inlet port, and an opening closed by the heat radiating plate, said opening opposing the air inlet port, with the fan located between the air inlet port and the opening.

2. A cooling unit according to claim 1, further comprising a heat pipe for transferring heat generated by the heat-generating component from the heat receiving portion to the heat exchanging portion.

3. A cooling unit according to claim 1, wherein the fan casing is made of metal having thermal conductivity and thermally connected to the heat exchanging portion of the heat radiating plate.

4. A cooling unit according to claim 1, wherein the air outlet port of the fan casing faces away from the heat-generating component.

5. A cooling unit according to claim 3, wherein the fan casing has a number of radiation fins.

6. A cooling unit according to claim 1, wherein the heat radiating plate constitutes, jointly with the fan casing, an air passage that extends from the air inlet port to the air outlet port.

7. A cooling unit according to claim 1, wherein the heat-generating component comprises a circuit board, an IC chip mounted on the circuit board and generating heat while operating, a metal case holding the circuit board and having a through hole exposing the IC chip and opposing the heat receiving portion, said IC chip thermally connected to the heat receiving portion.

8. A cooling unit according to claim 6, wherein the heat radiating plate has a smooth guide surface which contacts the cooling air flowing through the air passage.

9. A cooling unit according to claim 1, wherein the fan device has an axis aligned with a rotation axis of the fan, and the air inlet port and the opening are coaxial with the fan device.

10. A cooling unit according to claim 9, wherein the heat exchanging portion supports the fan device, with the axis intersecting with the heat radiating plate.

11. A cooling unit according to claim 9, wherein the heat exchanging portion supports the fan device, with the axis inclined to the heat radiating plate.

12. An electronic apparatus comprising:
    a housing;
    a heat-generating component provided in the housing; and
    a cooling unit provided in the housing, for cooling the heat-generating component, said cooling unit comprising:
        a heat radiating plate having a heat receiving portion thermally connected to the heat-generating component and a heat exchanging portion made integral with the heat receiving portion, said heat receiving portion and said heat exchanging portion arranged side by side; and
        an electric fan device having a fan and a flat fan casing holding the fan, said fan casing having an air inlet port for drawing cooling air when the fan is driven, an air outlet port for guiding the cooling air from the air inlet port, and an opening closed by the heat radiating plate, said opening opposing the air inlet port, with the fan located between the air inlet port and the opening.

13. An electronic apparatus according to claim 12, wherein the housing has a bottom wall extending parallel to the heat radiating plate.

14. An electronic apparatus according to claim 13, wherein the fan device and the heat-generating component are arranged between the heat radiating plate and the bottom wall of the housing.

15. An electronic apparatus according to claim 13, wherein the housing is made of metal having thermal conductivity and the heat radiating plate secured to the bottom wall of the housing.

16. An electronic apparatus according to claim 12, wherein the heat radiating plate constitutes, jointly with the fan casing, an air passage that extends from the air inlet port to the air outlet port, and the air outlet port faces away from the heat-generating component.

17. An electronic apparatus according to claim 12, further comprising a heat pipe for transferring heat generated by the heat-generating component from the heat receiving portion to the heat exchanging portion.

18. An electronic apparatus comprising:
    a housing having a bottom wall;
    a circuit board having a heat-generating component, provided in the housing and extending parallel to the bottom wall;
    a heat sink provided in the housing and having a heat receiving portion thermally connected to the heat-generating component and a heat exchanging portion connected to the heat receiving portion, said heat receiving portion and said heat exchanging portion arranged side by side; and an electric fan device arranged at the heat exchanging portion of the heat sink, said fan device having a fan and a flat fan casing holding the fan, said fan casing having an air inlet port for drawing cooling air when the fan is driven, an air outlet port for guiding the cooling air from the air inlet port and an opening closed by the heat exchanging portion, and said fan casing constituting, jointly with the heat exchanging portion, an air passage extending from the air inlet port to the air outlet port, and said opening opposing the air inlet port, with the fan located between the air inlet port and the opening.

19. An electronic apparatus according to claim 18, wherein the housing has a side wall having an exhaust port which communicates with the air outlet port of the fan casing.

* * * * *

UNITED STATES PATENT AND TRADEMARK OFFICE
CERTIFICATE OF CORRECTION

PATENT NO.    : 6,049,455                                      Page 1 of 1
DATED         : April 11, 2000
INVENTOR(S)   : Hiroshi Nakamura et al It is certified that error appears in the above-identified patent and that said Letters Patent is hereby corrected as shown below:

Title Page, Item [54], in the Title, line2, "COMPONENTS" should read --COMPONENT--.

Title Page, Item [57], in the Abstract, line 8, "having" should read --has--; and line 11, after "opening", insert --is--.

Signed and Sealed this

Twenty-sixth Day of June, 2001

Attest:

Attesting Officer

NICHOLAS P. GODICI
*Acting Director of the United States Patent and Trademark Office*